March 12, 1968  G. U. SORGER ET AL  3,373,354
VOLTAGE RATIO METER WITH FAST AND SLOW AUTOMATIC
FREQUENCY FOLLOWER
Filed Aug. 20, 1964  2 Sheets-Sheet 1

INVENTORS
Gunther U. Sorger
Bruno O. Weinschel

BY  Max L. Libman

ATTORNEY

March 12, 1968 G. U. SORGER ET AL 3,373,354
VOLTAGE RATIO METER WITH FAST AND SLOW AUTOMATIC
FREQUENCY FOLLOWER
Filed Aug. 20, 1964 2 Sheets-Sheet 2
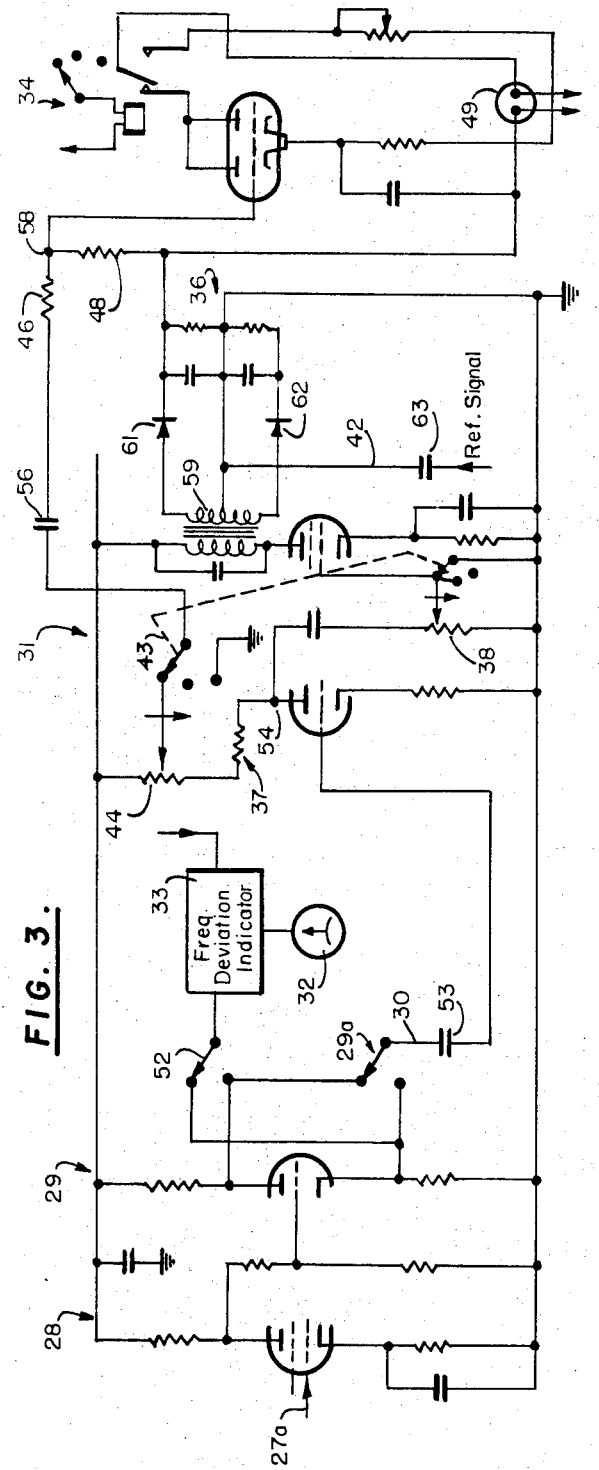
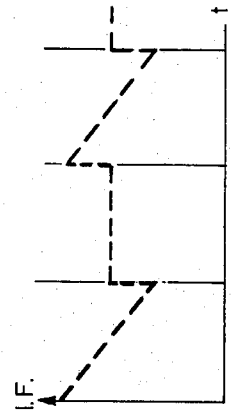
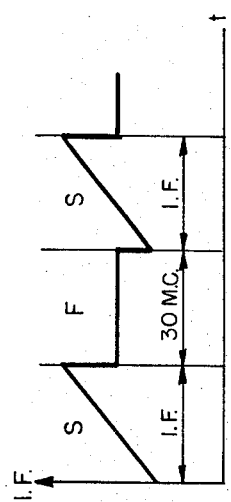
INVENTORS
Gunther U. Sorger
Bruno O. Weinschel
BY *Max L. Libman*
ATTORNEY United States Patent Office 3,373,354
Patented Mar. 12, 1968

3,373,354
VOLTAGE RATIO METER WITH FAST AND SLOW AUTOMATIC FREQUENCY FOLLOWER
Gunther U. Sorger, Rockville, and Bruno O. Weinschel, Bethesda, Md., assignors to Weinschel Engineering Co., Inc., Gaithersburg, Md., a corporation of Delaware
Filed Aug. 20, 1964, Ser. No. 390,894
5 Claims. (Cl. 324—58)

ABSTRACT OF THE DISCLOSURE

A high-frequency voltage ratio meter system for use in the range up to 4,000 megacycles having long time-constant means for maintaining the average frequency of an input intermediate frequency signal at the same value as the frequency of a standard source, and also having fast time-constant means for continuously and instantaneously correcting the frequency of the intermediate frequency for very fast deviations of the frequency of the input signal so as to at all times maintain an accurate comparison with the reference signal.

---

This invention relates to high frequency calibration systems and apparatus, and particularly to a high frequency voltage ratio meter system for use in calibrating laboratory equipment over a wide dynamic range in one step, and in a wide frequency range typically from 50 megacycles or lower to 4,000 megacycles and higher.

The present invention is directed to the same general type of instrument shown in U.S. Reissue Patent No. Re. 25,396 to Bruno O. Weinschel, entitled "Voltage Ratio Meter for High Frequency Calibration Systems." However, the present invention is directed to a meter system which can be constructed much less expensively, while having almost comparable performance to that described in the above-mentioned patent. The invention as used in connection with a practical instrument is capable of a number of additional uses, but the primary object of the present invention is to provide a highly accurate high frequency signal voltage ratio measuring system for measuring an input signal by comparison with a signal provided for a highly accurate standard source. It is a further object of the present invention to provide, in a highly sensitive instrument of the above type, means for continuously and instantaneously correcting for very fast deviations of the frequency of the input signal so as to maintain at all times an accurate amplitude comparison with the reference signal. It is a further object to provide a highly accurate precision measuring system of the above type which is relatively simple and inexpensive for such apparatus.

The specific nature of the invention as well as other objects and advantages thereof will clearly appear from a description of a preferred embodiment as shown in the accompanying drawings, in which:

FIG. 3 is a schematic circuit diagram showing the details of the fast and slow AFF portions of the system;

FIG. 4a is a characteristic curve showing the fast drifting action of the I.F. signal in the comparison system; and FIG. 4b shows the action of the corrective signal which is applied by the fast AFF to correct the condition of FIG. 4a.

Figures 1, 2:
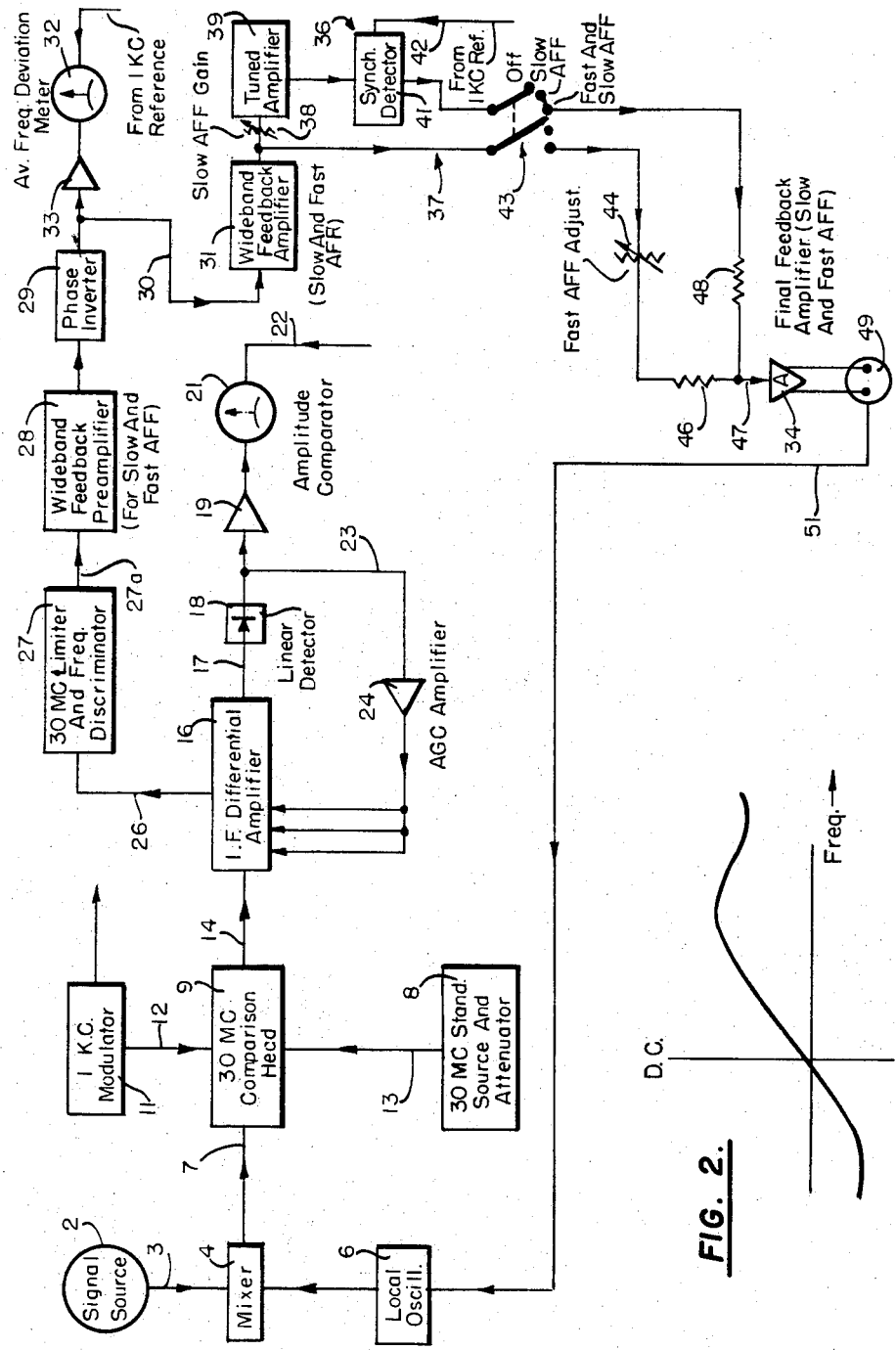
FIG. 1 is a block circuit diagram of a measuring system embodying the invention.
FIG. 2 is a typical discriminator characteristic curve.

There is a problem in measuring signal generators, or a signal source, or even a local oscillator, any of which has a frequency output which is not stable with time, but which varies not only by drifting away gradually from a nominal value, but also by varying (periodically or aperiodically) at short time intervals such as, for example, hum frequency modulation in klystrom circuits, or mechanical modulation in the case of high frequency triodes, etc. Furthermore, if a signal source is amplitude modulated there can be appreciable incidental, unwanted frequency modulation associated with the amplitude modulation. Certain klystrons under 100% amplitude modulation can exhibit frequency modulation as large as 1.5 megacycles which is much too large to be tolerated in a supposedly sensitive I.F. parallel substitution system of the type with which the present invention is concerned, or in any narrow band heterodyne microwave receiving system having a bandwidth in the order of 1 megacycle. In U.S. Reissue Patent No. Re. 25,396 there is described, in connection with a parallel-type I.F. substitution system, an automatic frequency follower (AFF) which provides the function of keeping the I.F. frequency at the average frequency of the reference source (for instance 30 megacycles), but it is also desirable that the instantaneous frequency should also remain at the frequency of the reference source. The above-referenced system for maintaining the average frequency at the frequency of the reference source is what we now call the "slow AFF." This works on the following principle: The input I.F. frequency which is the difference between the signal frequency and the local oscillator frequency (for instance 30 megacycles) is compared with a reference frequency derived for instance from an accurate 30 megacycle crystal controlled source. The two signals are interlaced with each other in a square wave fashion and the result fed into the frequency discriminator. The output of the frequency discriminator should then consist of a square-wave, one part of which is proportional to the frequency of the I.F., and the other part proportional to the frequency of the standard source. Unless both frequencies are alike, a squarewave appears in the output; if both frequencies are exactly alike, the output is D.-C., with no squarewave component. This output, after being passed through a tuned circuit if desired, is then fed into a synchronous detector, which receives its biasing signal from the same modulation source which modulates the interlacing of the two signals. A D.-C. voltage results from the synchronous detection, which is fed back, for example, to the repeller supply of the local oscillator, which adjusts the frequency of the local oscillator in such a manner as to maintain the I.F. at the frequency of the reference source. However, this is a relatively slow system. Because of the high feedback gain involved, it is not possible to increase the response time of this system, since this would produce regulation oscillations. Therefore, the time constant of the system is in the neighborhood of perhaps a second so that it can only take care of slow frequency drifts.

It is therefore a major object of the invention to incorporate a system capable of cancelling out the rapidly-occurring deviations of frequency. The present system which accomplishes this, is called the "fast AFF," where AFF stands for Automatic Frequency Follower. It incorporates the slow AFF system of the type above described, which keeps the average I.F. frequency at the frequency of the reference source as before. The output of the frequency discriminator, which is now exhibiting the incidental frequency modulation as an audio signal, is shown in FIG. 4a. This shows a typical intermediate frequency pattern vs. time. It has a sloping portion S due to the intermediate frequency varying with time, which is being measured, and a flat portion F corresponding to the reference frequency which is substantially constant. The tilt of the I.F. portion F represents a change in frequency during the "on" time, which is periodically repeated, since the slow AFF system keeps the average frequency at the frequency of the reference source. It is desired to eliminate the sloping portions and to maintain the intermediate frequency more nearly constant. If this frequency is fed through a frequency discriminator which is linear over a sufficiently large frequency range, as shown in FIG. 2 (where the curve does not necessarily have to go through zero at the reference frequency), we obtain a voltage which is directly proportional to the characteristic shown in FIG. 4a. This voltage is amplified in a wideband amplifier, so that there is substantially no phase shift, and then phase shifted 180° (for instance, in a vacuum tube). It can then be fed together with the slow AFF into a coupling network, and the result fed back into the local oscillator. If this is correctly done, the repeller of the local oscillator will then receive a signal which looks like a mirror image of the original frequency variation, and if this is done in a closed feedback loop, then the correction signal will be of the proper magnitude to produce a resulting output which is constant at all points. While this is not completely attained in practice, it is possible to compensate the major portion of the instantaneous deviation and thus obtain a substantially flat signal. The essence of the above procedure is that the average output is held to exactly the reference frequency by a synchronous detector, which gives the proper phase relationship between the signal output from the discriminator and the correction voltage.

In accordance with the present invention, it is necessary for both the slow AFF and the fast AFF circuits to be present, since there is a mutual interdependence and cooperation between them. Primarily, the slow drifts are taken care of by the slow AFF circuit, and the fast variations by the fast AFF circuit; however, there is also a further mutual cooperation between the two as will be explained below.

A feedback system such as the fast AFF circuit, which involves primarily a wide-band amplifier, and which changes the phase of an unbalanced signal 180°, and feeds this reversed signal back into the system for correction, always requires some kind of a reference with respect to which the correction is made. This is basic to all feedback systems. There must be a reference to which the quality of correction can be related. If no reference is provided, the feedback systems usually relate to zero signal or voltage as a reference. Therefore, the present fast feedback system, considered by itself, will provide a correction signal in such a manner as to make the A.-C. output of the frequency discriminator become zero. It can do this in different ways. The desired way in which it can do this is to create a frequency modulation of the local oscillator directly in opposition to the unwanted frequency modulation of the signal source. In this way, the frequency difference between the two will be exactly 30 megacycles, with no appreciable frequency deviation. This is the way the system will ordinarily work; however, since the reference point is actually a labile (or metastable) point, unless conditions are perfect, an error can occur. Under ideal conditions, the correction will be properly made, without the necessity for the slow AFF. However, this ideal condition is practically never attained in practice. In practice, the fast AFF by itself (the wide-band amplifier with the phase shift) will pull the frequency so far away that it reaches the end of the frequency discriminator characteristic where the discriminator can no longer function to discriminate, because the pass band of the I.F. amplifier and the characteristic of the frequency discriminator are such that even if a frequency modulation of the I.F. signal is actually occurring, it will not show up in the discriminator, since the discriminator has no gain or sensitivity left for these frequencies. Under these conditions, the output of the discriminator is zero, and this will therefore serve as a reference point, without achieving the desired correction, because this is not the proper reference point, due to the lack of stability of the zero reference point at which we would like to have the system operate. In order to stabilize this zero reference point correctly, the following is done: First, the slow AFF is activated, and in practice a switch is provided to insure that this operation occurs first in time (i.e., before the fast AFF is activated); this causes the average frequency to stay at exactly the reference frequency (for instance, 30 megacycles), since this is the function of the slow AFF, and this causes the average frequency to remain at the center of the frequency discriminator characteristic, which is correct. Now, if the fast AFF is also turned on, it cannot pull the frequency away because it cannot alter the average frequency, which is determined by the slow AFF. In other words, the slow AFF continually produces counter signals which counteract the tendency of the fast AFF to pull away as above described. Under these conditions, the fast AFF will always produce the correct frequency modulation on the local oscillator to keep the intermediate frequency as perfectly constant as practical. The fast AFF cannot overcome the slow AFF because the feedback gain in the slow AFF is perhaps a hundred times greater than that of the fast AFF. As above stated, the switch which turns the AFF on is so arranged that the operator must go from the off position through the slow AFF position to the fast AFF, which insures that the slow AFF is functioning at the time the fast AFF is superimposed on it so that the runaway condition cannot occur.

In feedback systems, it is necessary to be able to sense whether the signal is below or above the unknown input; this is accomplished by the slow AFF circuit. In addition, a fast AFF circuit is used which is exactly 180° out of phase with the slow signal, and if the feedback loop is closed, no oscillation can occur, and the fast system will reduce the incidental frequency modulation to a negligible amount.

As shown in the block diagram (FIG. 1), the signal source and the local oscillator are fed into a mixer provided with internal switching which may be like that shown in U.S. Reissue Patent No. Re. 25,396; the resulting output is fed into the frequency discriminator, the output of which is fed through an A.-C. wide-band amplifier and then to a tuned amplifier. The output of the tuned amplifier is fed into the synchronous detector. The synchronous detector is used essentially as a sensing element to maintain the average frequency of the I.F. signal at the frequency of the reference source, while, according to the invention, the fast AFF is used only as a correction for the A.-C. portion of the output. However, all of this cannot be accomplished in a single simple feedback system as shown in FIG. 1 of the above reissue patent because the overall gain in this feedback system is much too high to permit these fast variations to occur. Higher gain in a feedback loop goes together with a slower time constant in order to provide the necessary stability. In order to get the nominal frequency exactly equal the frequency of the reference source, a very high gain is required, since the two frequencies being maintained should be held to within approximately a kilocycle of each other, while the FM (which is usually in the order of a megacycle maximum, or less) requires only a gain in the order of perhaps of 100, to reduce the frequency difference to perhaps 10 kc. The frequency drift can therefore be very appreciable with respect to the FM. In order to provide a circuit capable of eliminating both the drift and the FM, both of them with a high degree of feedback, the novel procedure is to hold the average constant by means of the slow AFF system, with a very high feedback gain, and then put another loop gain around this system, which is strictly an A.-C. system in which the average frequency is used as a reference.

Referring to FIG. 1, it will be seen that the general system is similar to that in Weinschel Reissue Patent No. Re. 25,396. In general, the purpose is to very accurately measure signals from the signal source 2 on its output line 3. In practice, the equipment will usually include suitable attenuator means, impedance matching means, etc., as is conventional in this type of equipment. Furthermore, the equipment in practice is provided with switching means whereby it is capable of measuring amplitude modulation and frequency modulation quite accurately, and can also be used as a straight microwave receiver. However, the present invention is concerned essentially with means for improving the sensitivity and accuracy of the system for the measurement of incoming RF signals by comparison with a standard in a parallel type I.F. substitution system. As exemplified in FIG. 1, the signal on line 3 is mixed in mixer 4 with the output of a local oscillator 6 which is operated at a frequency separated from the frequency of the RF signal on line 3 by the intermediate frequency (for instance 30 megacycles). The mixer output on line 7 is therefore to be maintained at the intermediate frequency (30 megacycles), and since the mixer 4 has a linear characteristic, the amplitude of the output voltage on line 7 is linearly related to the amplitude of the RF input signal. The mixer output is compared with the output of a highly stable reference as standard source 8, which is fed to the comparison head 9 through a precision piston attenuator (not shown) in order to supply a very accurately controlled amplitude to the comparison head 9. The amount of change in attenuation of the attenuator associated with the standard source required to maintain equality (or at least a constant fixed ratio) of the inputs to the comparison head 9 is measured as indicative of the change in signal generator output. In order to make the desired comparison, a parallel type I.F. substitution is employed. The two amplitudes of the I.F. signal and the standard signal are compared in interlaced fashion at some convenient frequency, preferably 1,000 c.p.s. This is done by means of a 1 kc. modulator 11 which produces a 1 kc. squarewave with adjustable phase and duty cycle so arranged that the two outputs on lines 7 and 13 are interlaced, i.e., when there is a pulse on one line there is none on the other line, and vice versa. The output on line 14 is applied to I.F. differential amplifier 16; this output consists of an I.F. signal due either to the signal from the standard source 8 through its attenuator, or the signal from the generator or other signal source 2 through the mixer 4. If these two signals are now of proper relative amplitude, the resulting signal going into the I.F. differential amplifier 16 is a steady I.F. signal with no 1,000 cycle amplitude modulation apparent; however, if the two signals are not of the proper relative amplitude, then the I.F. signal will be amplitude modulated at 1,000 cycles on line 17; this is demodulated by linear detector 19, amplified at 19 by a tuned 1,000 cycle amplifier, and applied to a phase sensitive 1,000 cycle null indicator 21, which is also supplied on line 22 with a 1 kc. comparison input from modulator 11. All of the above elements are essentially similar to those shown in the above reissue patent.

The I.F. differential amplifier 16 is carefully regulated, and for this purpose an output is taken on line 23 through AGC amplifier 24, as schematically indicated in FIG. 1. Any suitable known system of gain control may be employed.

A major error-producing source of 1,000 cycle amplitude modulation at the output of the differential amplifier can occur if the two signals which are being compared differ slightly in frequency. As above explained, it is necessary to keep such difference in frequency due to any slope in the I.F. amplifier characteristic as small as possible. This is more important than maintaining the standard source exactly at its rated frequency, since as long as the two signals are of the same frequency, this type of error will not occur. As the frequency rises, the absolute drift that is tolerable does not change, but the percentage drift becomes more important, and the percentage drift which is tolerable becomes much less because of the higher frequency.

The output of I.F. differential amplifier 16 is fed on line 26 to a suitable 30 megacycle limiter and frequency discriminator 27 and thence to a wide-band feedback preamplifier 28, the output of which is fed through a phase inverter 29 to a wide-band feedback amplifier 31. An average frequency deviation meter 32 is supplied through a suitable amplifier 33, and may be arranged for frequency comparison with a signal from the 1 kc. modulator, similar in arrangement in Reissue Patent No. Re. 25,396.

The output of amplifier 31 is supplied on two channels to final feedback amplifier 34, these two channels being respectively the slow and the fast AFF channels 36 and 37 respectively. The slow AFF channel has a gain control 38, a 1,000 cycle tuned amplifier 39, and a synchronous detector 41, which is also supplied by a signal on line 42 from the 1 kc. reference taken from the modulator 11. A double-pole switch 43 is provided which is so arranged, as explained above, that when it is thrown from the "Off" position in which it is shown, the slow AFF circuit will first be closed and then both the slow and the fast AFF circuits will be closed in the final position of the switch. Alternatively, only the slow AFF position can be selected if desired.

With switch 43 in the fully closed position for both slow and fast AFF, the fast AFF signal is fed through gain control 44 and decoupling resistor 46 to junction point 47. The slow AFF signal is similarly fed through decoupling resistor 48 to point 47. As will be explained in more detail below, both signals are passed together through final feedback amplifier 34 to output terminal 49 on the face of the control panel, and thence via line 51 back to the local oscillator as a control signal.

FIG. 3 is a schematic diagram of that portion of the circuit between the elements 28 and 49 in the block diagram of FIG. 1. It will be understood that the rest of the circuit may be essentially similar to that shown in the above-mentioned Reissue Patent No. Re. 25,396 and therefore will not be shown in detail. Corresponding elements are given the same reference numbers as in FIG. 1 for identification. The wide-band frequency preamplifier 28 is supplied on lead 27a from the limiter and frequency discriminator 27, which may be a conventional Foster-Sealy circuit, preceded by two limiter stages to avoid erroneous indications due to amplitude modulation. Preamplifier 28 and phase-inverter 29 may conveniently be a dual pentode-triode such as type 6EA8 tube. The triode output may be taken from either the cathode or the anode by switch 29a, which functions to invert the phase of the output by 180°. This is necessary in order to insure that the signal is in the proper phase for its intended negative feedback function, since it must arrive in opposition to the main signal which it is to cancel. The proper phase relationship depends upon whether the local oscillator frequency is above or below the measurement signal frequency, and switch 29a must be adjusted accordingly to provide the correct opposite phase relationship. The frequency deviation indicator 33 is also supplied from the output of the triode portion of the dual tube by switch 52. However, this frequency deviation indicator does not per se constitute a part of the present invention. The signal from switch 29a is taken through coupling condenser 53 to the grid of the triode side of another triode-pentode combination which constitutes the feedback amplifier 31. This side is used for the amplification of both the fast and the slow AFF signals. The signal for the slow AFF system is taken directly from the plate of the triode section at point 54, while the signal for the fast AFF section is taken from the wiper of the potentiometer 44 which provides the feedback gain adjustment for fast AFF. This signal is then passed through coupling condenser 56 and resistor 46 to point 58. The signal for the slow AFF is fed through potentiometer 38, which is the slow AFF gain control, to the grid of the pentode section of the dual tube, which constitutes the final amplifier for the slow AFF. The plate load for this pentode section is a transformer 59, which might be tuned, and provides the signal for the synchronous detector, which consists of two diodes 61 and 62. The reference signal for the synchronous detector is fed through capacitor 63 from the 1,000 cycle source in modulator 11, where times the interlace of the signals on lines 7 and 13 through comparison head 9.

The output of synchronous detector 36, which is a D.-C. output, is fed through another decoupling resistor 48 to the same point 58 which received the fast AFF signal. The signals are therefore combined into a composite correction signal having a D.-C. component of slow AFF and an A.-C. component for fast AFF. The D.-C. signal is the correction signal necessary to bring the average frequency to exactly the frequency of the reference source as above described, while the A.-C. signal is the signal which will bring the instant frequency modulation to zero. These signals are supplied to the grid of the final feedback amplifier 34 to produce the correction signal at the terminals of connector 49, from where it is fed back to the local oscillator as shown in FIG. 1. The ensuing corrective action will then occur as described above.

It will be apparent that the embodiments shown are only exemplary and that various modifications can be made in construction and arrangement within the scope of our invention as defined in the appended claims.

We claim:
1. A radio-frequency signal measurement system comprising:
   (a) means for receiving a radio-frequency signal of a predetermined frequency;
   (b) means for converting said radio-frequency signal to an intermediate frequency signal;
   (c) voltage-responsive means for adjusting said intermediate frequency to a predetermined frequency value;
   (d) a standard reference signal source accurately fixed at said predetermined intermediate frequency value;
   (e) interlace means including a low-frequency modulating device for interlacing said intermediate frequency signal and reference signals from said signal source at a low frequency to produce an interlaced output in which each of said signals is alternately supplied at said low frequency;
   (f) frequency discriminator means fed with said interlaced output and providing an output voltage which is a function of the instantaneous difference between the intermediate frequency signal and the standard reference signal;
   (g) high-gain, relatively slow time-response amplifier circuit means fed by said frequency discriminator means to provide a direct-current output voltage indicative of the sense and magnitude of the average difference between the frequencies of said interlaced output signals;
   (h) low-gain, relatively fast time-responsive circuit means fed by said frequency discriminator means to provide a corrective signal opposing the instantaneous deviation of the frequency of the intermediate frequency signal from the average intermediate frequency;
   (i) means for applying said direct-current output voltage and said corrective signal to said means for adjusting the intermediate frequency, to equalize the frequency of said intermediate frequency signal with that of the standard source.

2. In a radio-frequency signal test system comprising:
   (a) a high-frequency signal generator;
   (b) a standard source of intermediate frequency;
   (c) a local oscillator;
   (d) a mixer for beating the output of said generator with the output of the local oscillator to provide a beat frequency output at the same frequency as the standard intermediate frequency source;
   (e) an intermediate frequency amplifier;
   (f) interlace means including an audio-frequency modulating device for supplying the output of said mixer and said standard source in counterphase to said intermediate frequency at said audio-frequency so that each of said outputs is alternately supplied in squarewave fashion;
   (g) frequency discriminator means fed with the interlaced output of said interlaced means and providing an output voltage which is a function of the instantaneous difference between the intermediate frequency signal and the standard reference signal;
   (h) high-gain, relatively slow time-responsive amplifier circuit means fed by said frequency discriminator means to provide a direct current output voltage indicative of the sense and magnitude of the average difference between the frequencies of said interlaced output signals;
   (i) low-gain, relatively fast time-responsive circuit means fed by said frequency discriminator means to provide a corrective signal opposing the instantaneous deviation of frequency of the intermediate frequency signal from the average intermediate frequency signal;
   (j) frequency-control means for varying the frequency of said local oscillator output; and
   (k) means for applying said direct-current voltage and said corrective signal to said frequency-control means to equalize the frequency of said mixer output to that of said standard source.

3. The invention according to claim 2, said frequency-control means being voltage-controlled.

4. The invention according to claim 2, said means (h) comprising tuned amplifier means responsive to signals from said frequency discriminator means at said audio-frequency, and synchronous detector means responsive to the output of said tuned amplifier at said audio-frequency.

5. The invention according to claim 4, said means (i) comprising means responsive to radio-frequency signals from said frequency discriminator means to produce fast feedback signals at radio-frequency and in phase opposition to the received radio-frequency signal deviations.

References Cited
UNITED STATES PATENTS

| | | | |
|---|---|---|---|
| 2,351,658 | 9/1958 | Howson | 324—82 X |
| 2,924,706 | 2/1960 | Sassler | 324—82 X |
| 3,034,045 | 5/1962 | Weinschel | 324—58 |
| 3,119,062 | 1/1964 | Codd | 324—58 X |
| 3,207,995 | 9/1965 | Beer et al. | 324—79 X |

RUDOLPH V. ROLINEC, *Primary Examiner.*

P. F. WILLE, *Assistant Examiner.*